(12) United States Patent
Tseng et al.

(10) Patent No.: US 12,209,643 B2
(45) Date of Patent: Jan. 28, 2025

(54) ACTUATOR DEVICE

(71) Applicant: TOYO AUTOMATION CO., LTD., Tainan (TW)

(72) Inventors: Kun-Cheng Tseng, Tainan (TW); Ming-Chi Su, Tainan (TW)

(73) Assignee: Toyo Automation Co., Ltd., Tainan (TW)

( * ) Notice: Subject to any disclaimer, the term of this patent is extended or adjusted under 35 U.S.C. 154(b) by 0 days.

(21) Appl. No.: 18/527,050

(22) Filed: Dec. 1, 2023

(65) Prior Publication Data
US 2025/0003469 A1 Jan. 2, 2025

(30) Foreign Application Priority Data
Jun. 29, 2023 (TW) .................................. 112124343

(51) Int. Cl.
*F16H 25/24* (2006.01)
*F16H 57/04* (2010.01)

(52) U.S. Cl.
CPC ..... *F16H 25/2418* (2013.01); *F16H 57/0497* (2013.01)

(58) Field of Classification Search
CPC .... F16C 29/086; F16C 29/088; F16C 29/084; F16C 29/08; F16C 29/082; B23Q 1/58; B23Q 11/0875; F16H 25/2418; F16H 2025/204
See application file for complete search history.

(56) References Cited

U.S. PATENT DOCUMENTS

| | | | | |
|---|---|---|---|---|
| 4,934,835 A * | 6/1990 | Albert | ................... | F16C 29/004 384/49 |
| 6,435,719 B1 * | 8/2002 | Riedel | ................... | F16C 29/082 384/49 |
| 9,841,089 B2 * | 12/2017 | Yamakura | ........... | F16C 29/0602 |
| 11,067,126 B2 * | 7/2021 | Tseng | ................... | F16C 33/1025 |

* cited by examiner

*Primary Examiner* — Gregory Robert Weber
(74) *Attorney, Agent, or Firm* — Rosenberg, Klein & Lee

(57) ABSTRACT

An actuator device includes a base unit, a sliding unit, and a scraping unit. The base unit includes a base seat defining a receiving space, two magnets mounted to the base seat, and a steel belt that covers the receiving space and that is attracted to the magnets. The sliding unit is disposed on the base unit, and includes a sliding table that has a pass channel through which the steel belt extends. A nut seat is connected to the sliding table. The scraping unit is mounted to the sliding unit, and includes a scraping member that abuts against the steel belt. A threaded shaft is connected to a nut seat, such that a driving member is operable to drive rotation of the threaded shaft to thereby move the sliding unit along the threaded shaft relative to the base unit.

11 Claims, 12 Drawing Sheets

ACTUATOR DEVICE

CROSS-REFERENCE TO RELATED APPLICATION

This application claims priority to Taiwanese Patent Application No. 112124343, filed on Jun. 29, 2023, which is incorporated herein by reference in its entirety.

FIELD

The disclosure relates to a linear actuating device, and more particularly to an actuator device.

BACKGROUND

An actuator device, as disclosed in JP 6025625, includes a moisture absorbing unit for reducing moisture inside thereof.

As shown in FIGS. 11 and 12, another actuator device, as disclosed in JP5968732, is easily assembled/disassembled. Dustproof and waterproof abilities of the actuator device of JP5968732 are enhanced. Regarding the actuator device of JP5968732, a front cover seal member 41 is clamped between a housing body 5 of a housing 3 and a front bracket 23a. A rear cover seal member 62 is clamped between the housing body 5 and a rear cover 9.

With enhanced waterproof and dustproof abilities, the actuator of JP 5968732 may prevent foreign objects, water droplets and dust from entering the housing 3 through two opposite ends of the housing body 5. Specifically, a first rod seal member 33 and a second rod seal member 35 are provided to the front bracket 23a. The first rod seal member 33 is disposed outside the housing 3, and the second rod seal member 35 is disposed inside the housing 3. Therefore, even if foreign objects and water droplets enter through a gap between the first rod seal member 33 and a rod 85, the second seal member 35 may prevent foreign objects and water droplets from entering the housing 3. In addition, a soft wiper 33e is disposed at a rear end of an inner peripheral surface of the first rod seal member 33. The first rod seal member 33 is wiped by the soft wiper 33e, so foreign objects and water droplets may be collected between the first rod seal member 33 and the second rod seal member 35. The first rod seal member 33 and the second rod seal member 35 may prevent grease and abrasion powder generated in the housing 3 from falling outside the housing 3.

SUMMARY

Therefore, an object of the disclosure is to provide an actuator device that can be waterproof and dustproof.

According to an object of the disclosure, an actuator device includes a base unit, a sliding unit, a scraping unit, and a driving unit.

The base unit includes a base seat, two magnets, and a steel belt. The base seat is elongated in a longitudinal direction, has an inverted U-shaped cross section, and defines a receiving space opening downwardly and having a bottom opening. The two magnets extend in the longitudinal direction, are mounted to the base seat, are spaced apart from each other in a transverse direction perpendicular to the longitudinal direction, and are disposed respectively at opposite sides of the bottom opening of the receiving space. The steel belt covers the bottom opening of the receiving space and is attracted to the magnets. The steel belt has a main layer that has an inner surface facing the receiving space and an outer surface opposite to the inner surface, and an abrasive-resistant layer that is fixedly coated on the outer surface.

The sliding unit is disposed on the base unit, is movable along an axis that is parallel to the longitudinal direction relative to the base unit, and includes a sliding table and a nut seat. The sliding table has a pass channel having opposite ends in the longitudinal direction. The steel belt extends through the pass channel and is in contact with the sliding table at a plurality of contact portions. The nut seat is connected to the sliding table.

The scraping unit is mounted to the sliding unit, and includes a scraping member that abuts against the abrasive-resistant layer.

The driving unit is mounted to the base unit, and includes a driving member and a threaded shaft that is threadedly connected to the nut seat, such that the driving member is operable to drive rotation of the threaded shaft to thereby move the sliding unit along the threaded shaft relative to the base unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
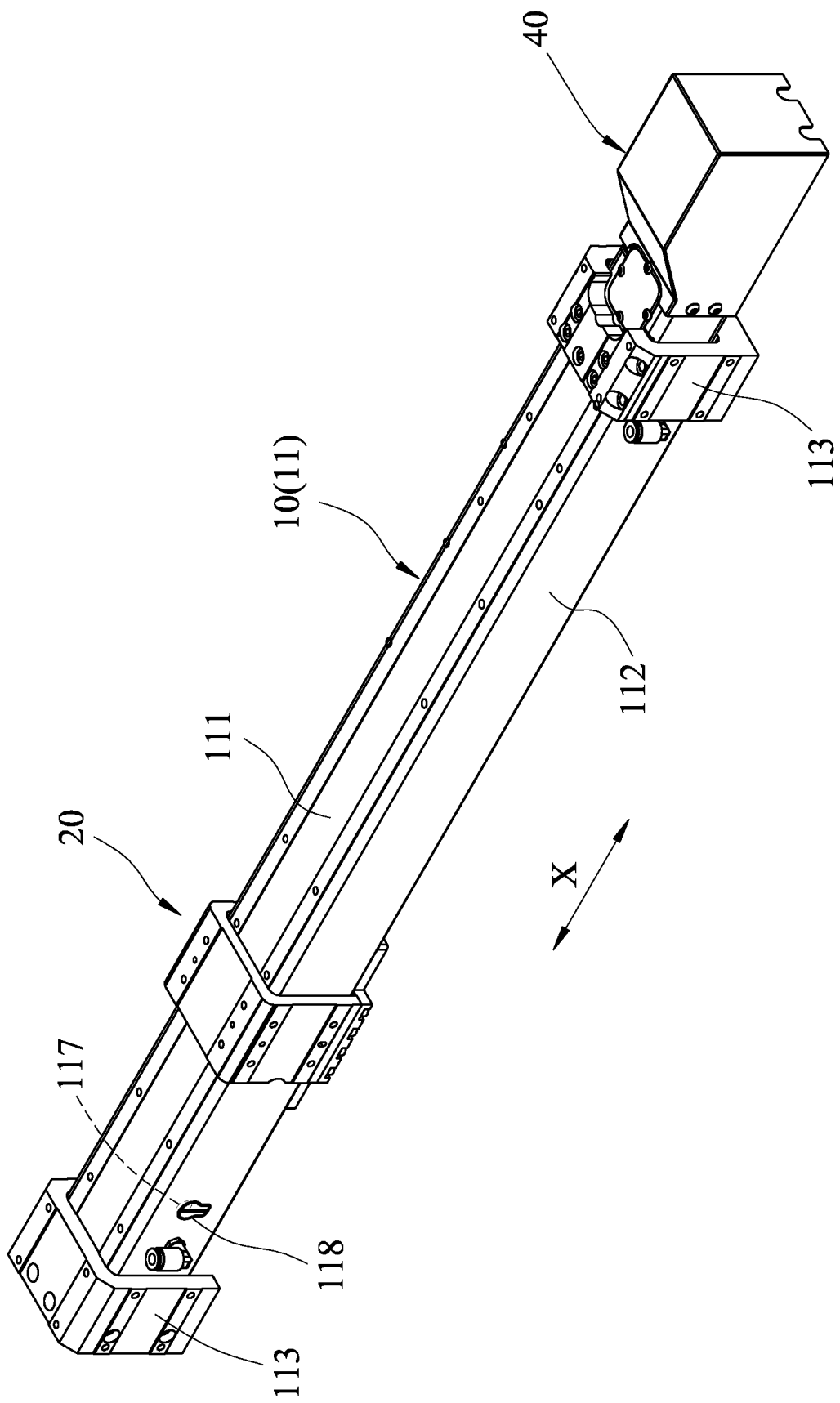
FIG. 1 is a perspective view illustrating an actuator device according to an embodiment of the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
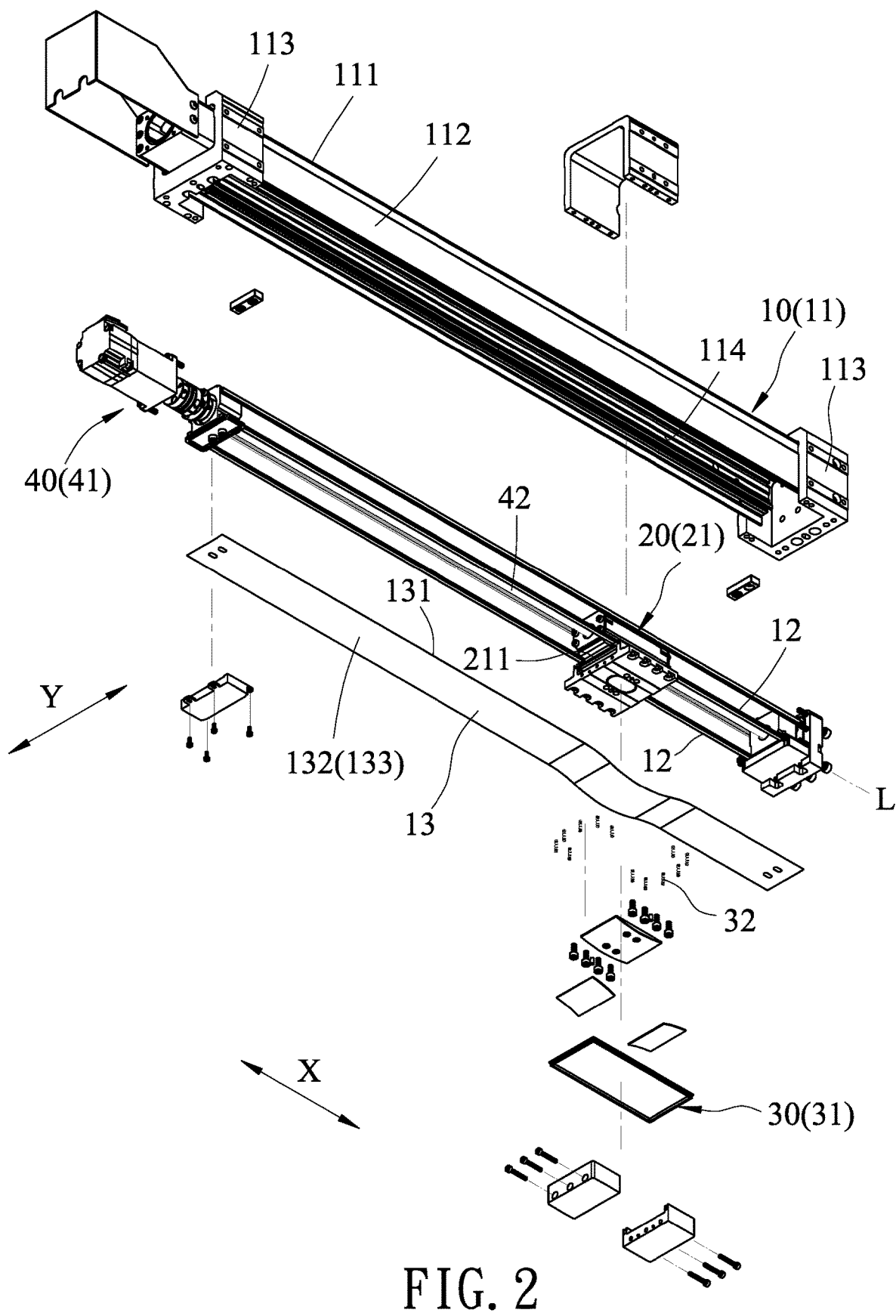
FIG. 2 is an exploded perspective view of the embodiment.
Figure 3:
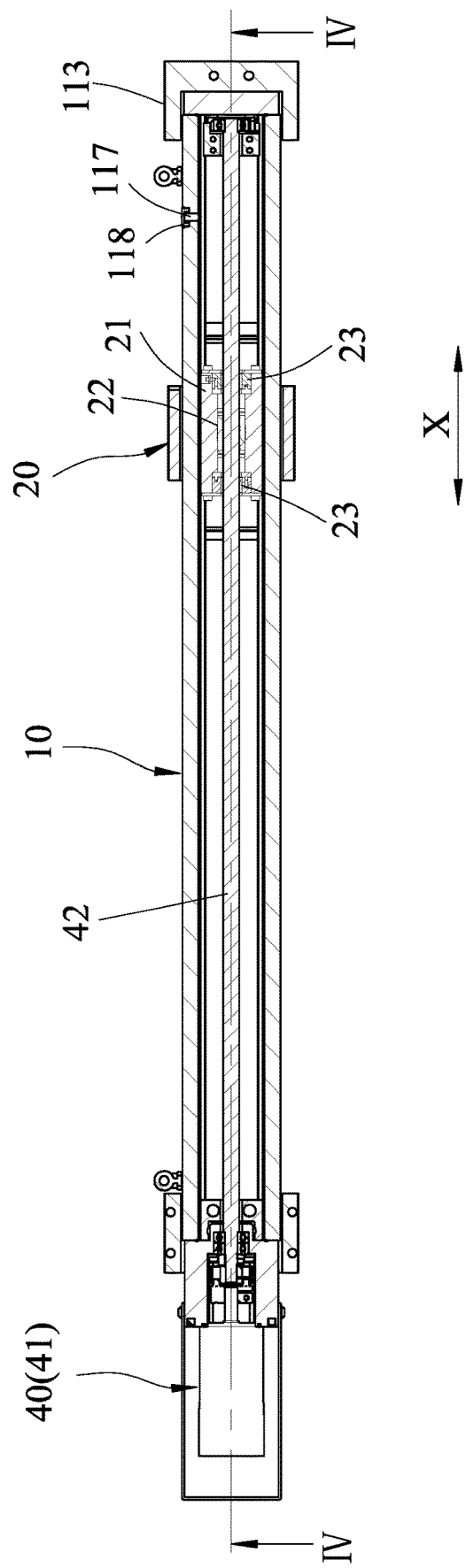
FIG. 3 is an assembled sectional view of the embodiment.

Referring to FIGS. 1 to 3, an actuator device according to an embodiment of the disclosure includes a base unit 10, a sliding unit 20, a scraping unit 30, and a driving unit 40.

Figure 4:
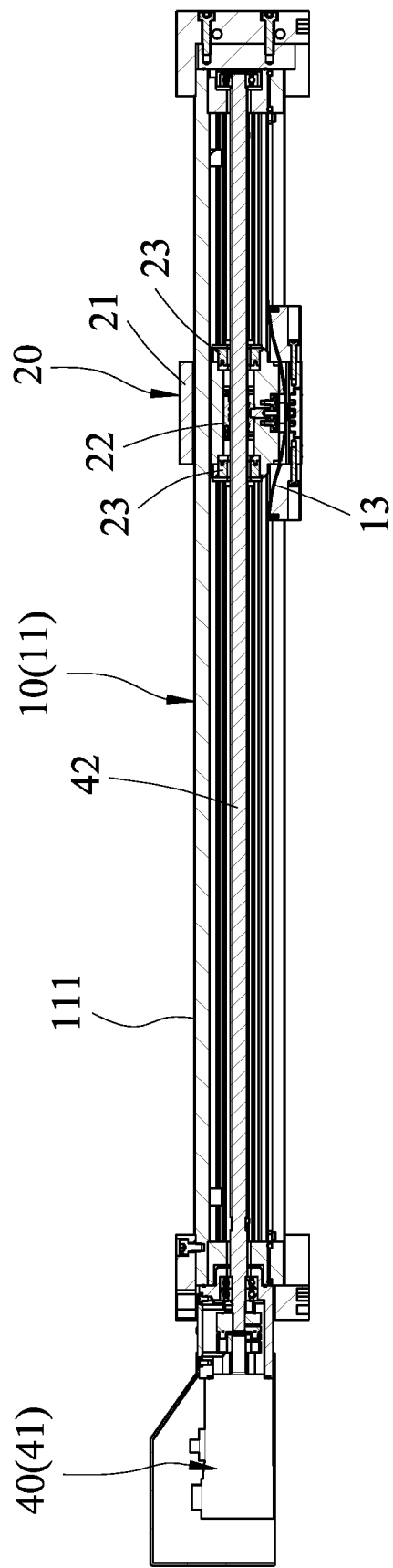
FIG. 4 is a sectional view taken along line IV-IV from FIG. 3.

Referring to FIGS. 3 and 4 in combination with FIGS. 1 and 2, the base unit 10 includes a base seat 11, two magnets 12, and a steel belt 13.

Figure 8:
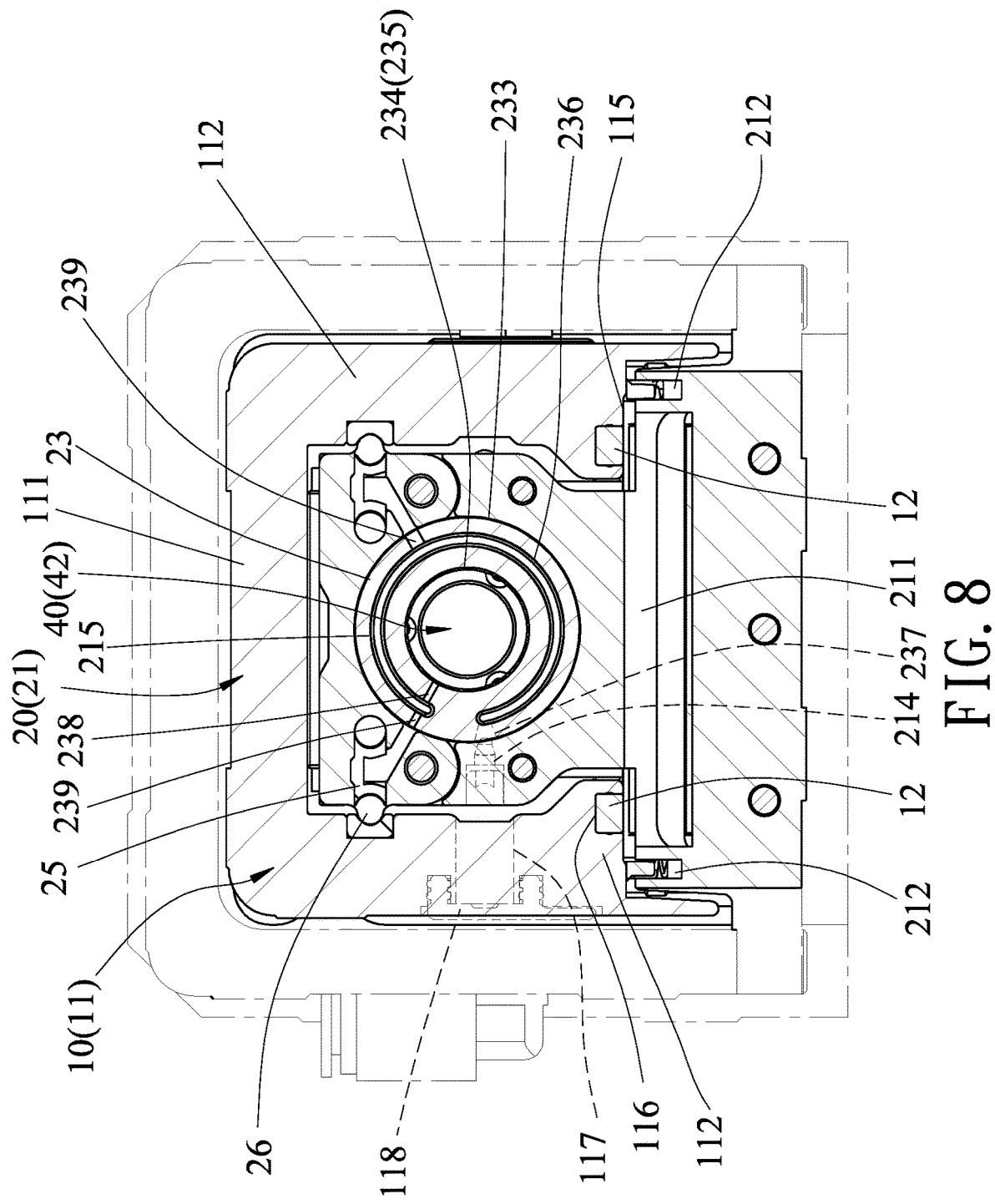
FIG. 8 is a schematic sectional view taken along line VIII-VIII of FIG. 5.

The base seat 11 is elongated in a longitudinal direction (X), is interconnected with two terminal seats 113, and has an inverted U-shaped cross section (as shown in FIG. 8). In this embodiment, the base seat 11 has a top wall 111 and two side walls 112 extending respectively and downwardly from two opposite sides of the top wall 111. The top wall 111 and the side walls 112 cooperatively define a receiving space 114 opening downwardly and having a bottom opening. Each of the side walls 112 has a bottom surface 115 and an embedment recess 116 recessed upwardly from the bottom surface 115. The embedment recesses 116 of the side walls 112 are disposed respectively at opposite sides of the bottom opening of the receiving space 114. One of the side walls 112 further has an oil injection hole 117 disposed adjacent to one of the terminal seats 113. A seal cap 118 removably covers the oil injection hole 117.

The magnets 12 extend in the longitudinal direction (X), are spaced apart from each other in a transverse direction (Y) perpendicular to the longitudinal direction (X), and are mounted respectively to the embedment recesses 116 of the side walls 112.

The steel belt 13 covers the bottom opening of the receiving space 114 and is attracted to the magnets 12. Two opposite ends of the steel belt 13 are respectively fixed to the terminal seats 113. Furthermore, the steel belt 13 has a main layer that has an inner surface 131 facing the receiving space 114 and an outer surface 132 opposite to the inner surface 131, and an abrasive-resistant layer 133 that is fixedly coated on the outer surface 132 (as shown in FIGS. 1 and 6).

The sliding unit 20 is disposed on the base unit 10, is movable along an axis (L) that is parallel to the longitudinal direction (X) relative to the base unit 10. The sliding unit 20 includes a sliding table 21, a nut seat 22 that is connected to the sliding table 21, two oil-guiding sleeves 23 that are mounted to the sliding table 21, two ball circulating mechanisms 25 that are mounted in the sliding table 21 (as shown in FIG. 8), and two ball sets 26 that are respectively mounted in the ball circulating mechanisms 25 (as shown in FIG. 8).

Figure 6:
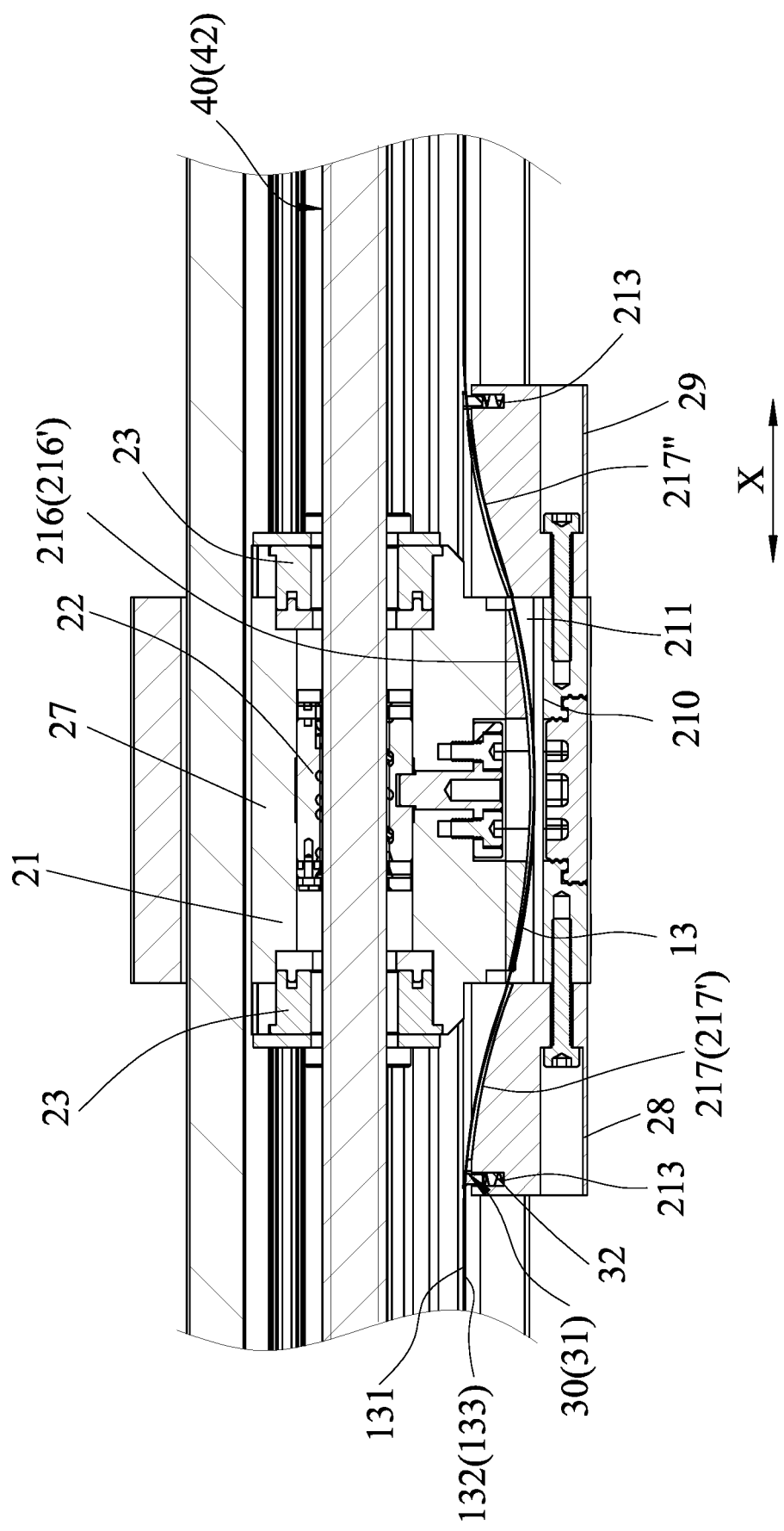
FIG. 6 is an enlarged fragmentary schematic view of FIG. 4.
Figure 9:
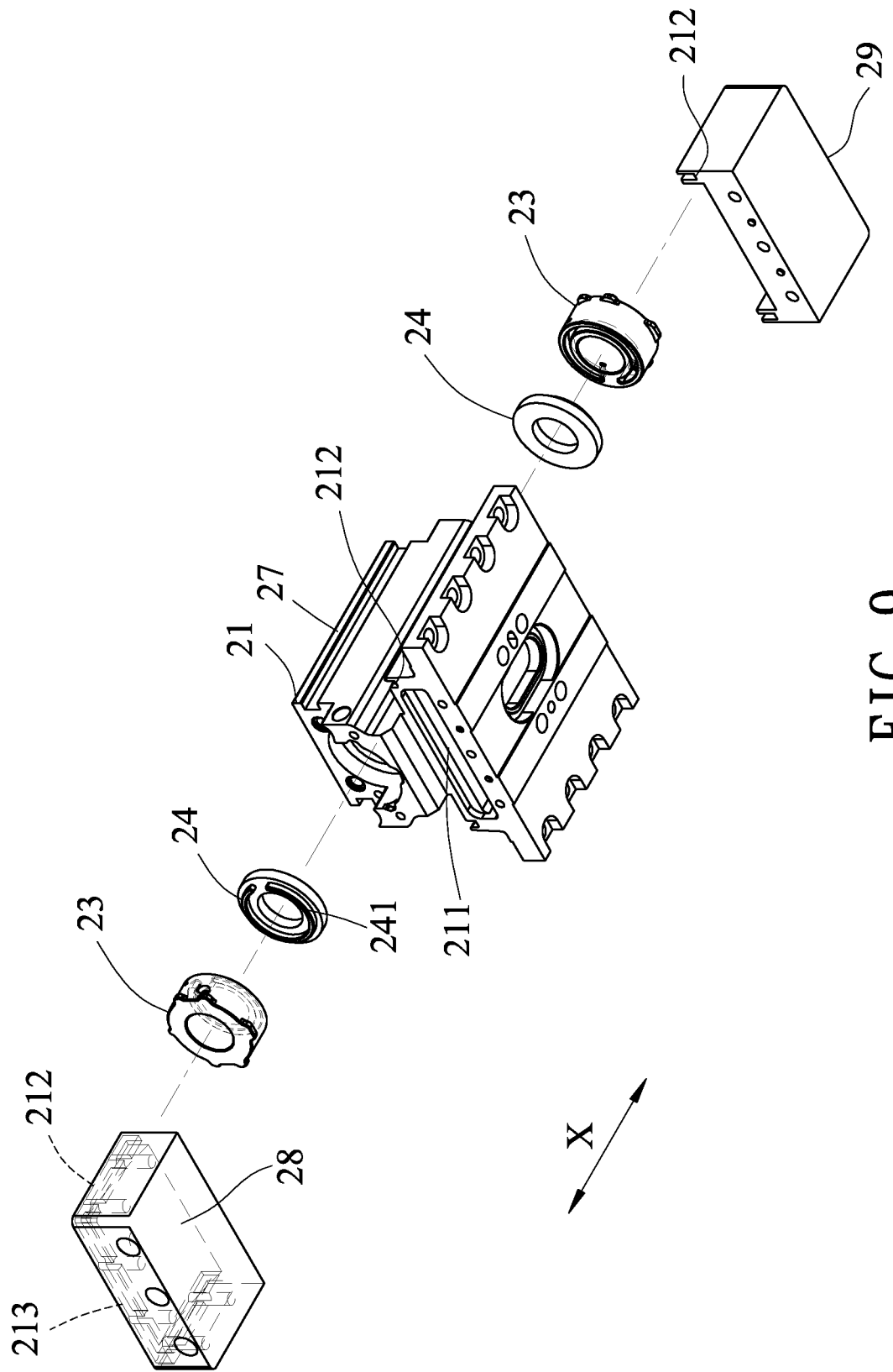
FIG. 9 is an exploded perspective view of the embodiment, illustrating a sliding table of the actuator device.

Referring to FIG. 9 in combination with FIGS. 6 and 8, the sliding table 21 has a main body 27, a first side body 28 that is connected to one end of the main body 27, and a second side body 29 that is connected to another end of the main body 27 opposite to the first side body 28 in the longitudinal direction (X). A pass channel 211 of the sliding table 21 has opposite ends in the longitudinal direction (X). The steel belt 13 extends through the pass channel 211 and is in contact with the sliding table 21 at a plurality of contact portions. In this embodiment, the sliding table 21 further has two first recesses 212, two second recesses 213, and a one-way valve 214. The first recesses 212 extend in the longitudinal direction (X) and are parallel to each other. The second recesses 213 extend in the transverse direction (Y) and communicate with the first recesses 212. The one-way valve 214 may be aligned with the oil injection hole 117, and is adapted for permitting oil supplied from the oil injection hole 117 to flow along an oil path 215 into the sliding unit 20.

Figure 7:
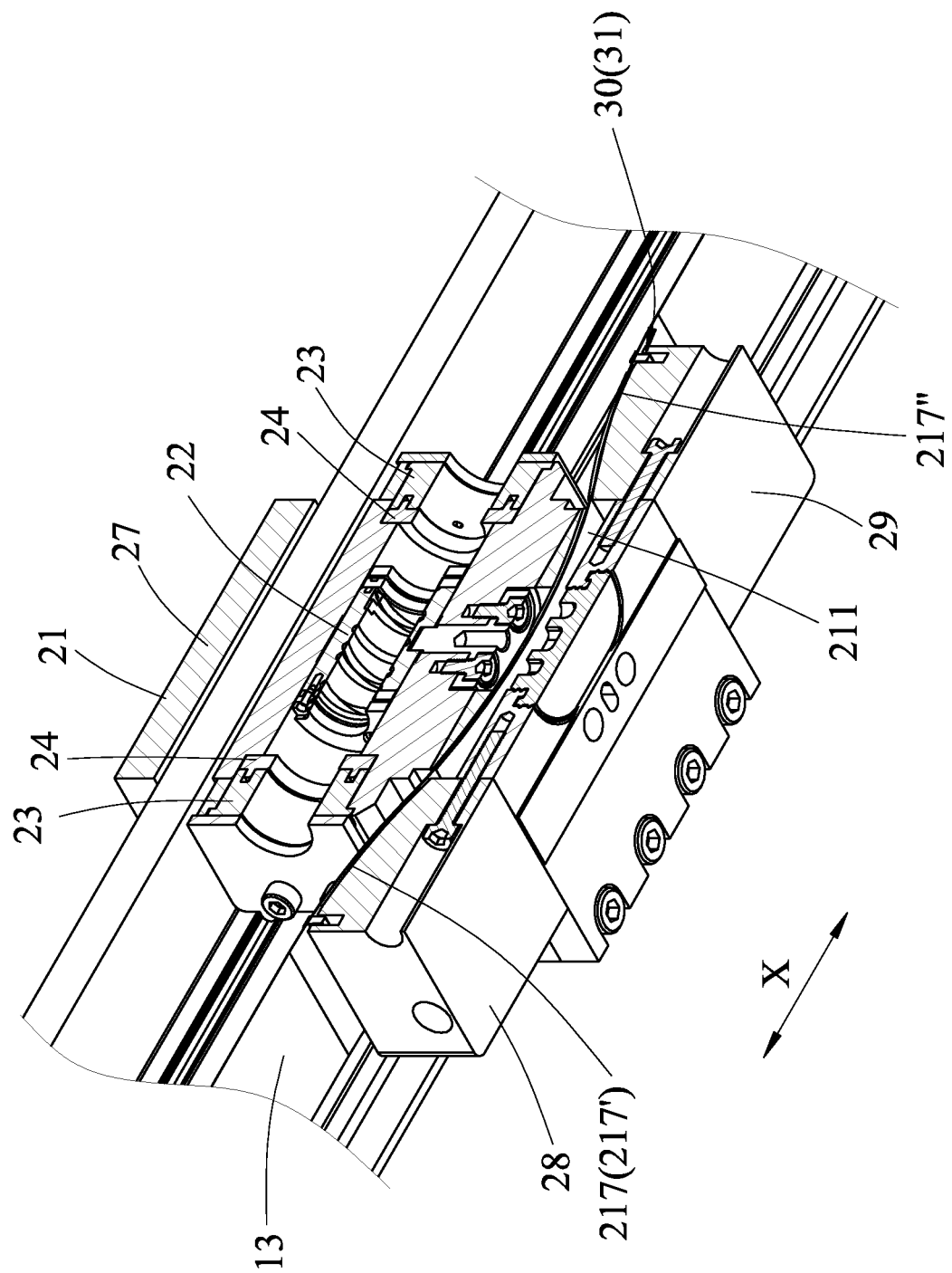
FIG. 7 is a fragmentary schematic perspective view of FIG. 6.

As shown in FIGS. 6 and 7, the pass channel 211 is defined between a top channel surface 216 that is formed on the main body 27, and a bottom channel surface 217 that is formed on the first and second side bodies 28, 29. In this embodiment, the bottom channel surface 217 has a first abutting portion 217', a second abutting portion 217", and an intermediate portion 210. The first abutting portion 217' is formed on the first side body 28 and projects curvedly upwardly. The second abutting portion 217" is formed on the second side body 29 and projects curvedly upwardly. The intermediate portion 210 is formed on the main body 27 and is disposed between and lower than the first abutting portion 217' and the second abutting portion 217". The top channel surface 216 has a top abutting portion 216' that projects curvedly and downwardly toward the intermediate portion 210 of the bottom channel surface 217. The steel belt 13 is in contact with the first abutting portion 217', the second abutting portion 217", and the top abutting portion 216' at the contact portions, respectively. That is to say, the abrasive-resistant layer 133 of the steel belt 13 contacts the first abutting portion 217' and the second abutting portion 217", whereas the inner surface 131 of the steel belt 13 contacts the top abutting portion 216'. Furthermore, the first recesses 212 and the second recesses 213 form a rectangular configuration. The first recesses 212 are spaced apart from each other in the transverse direction (Y) and are disposed respectively at two opposite sides of the intermediate portion 210 of the bottom channel surface 217. The second recesses 213 are formed respectively in the first abutting portion 217' and the second abutting portion 217" of the bottom channel surface 217.

Figure 5:
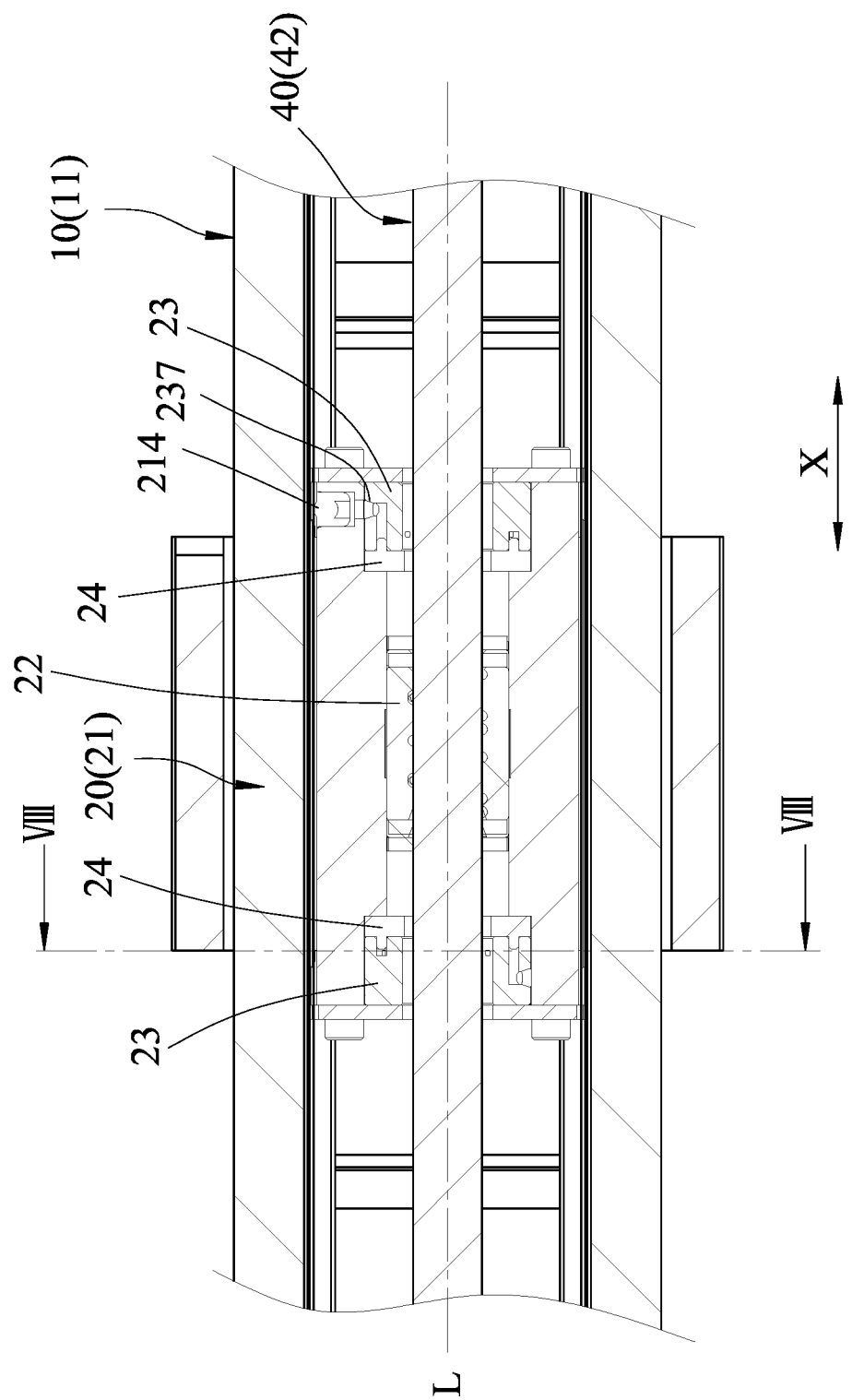
FIG. 5 is an enlarged fragmentary schematic view of FIG. 3.
Figure 10:
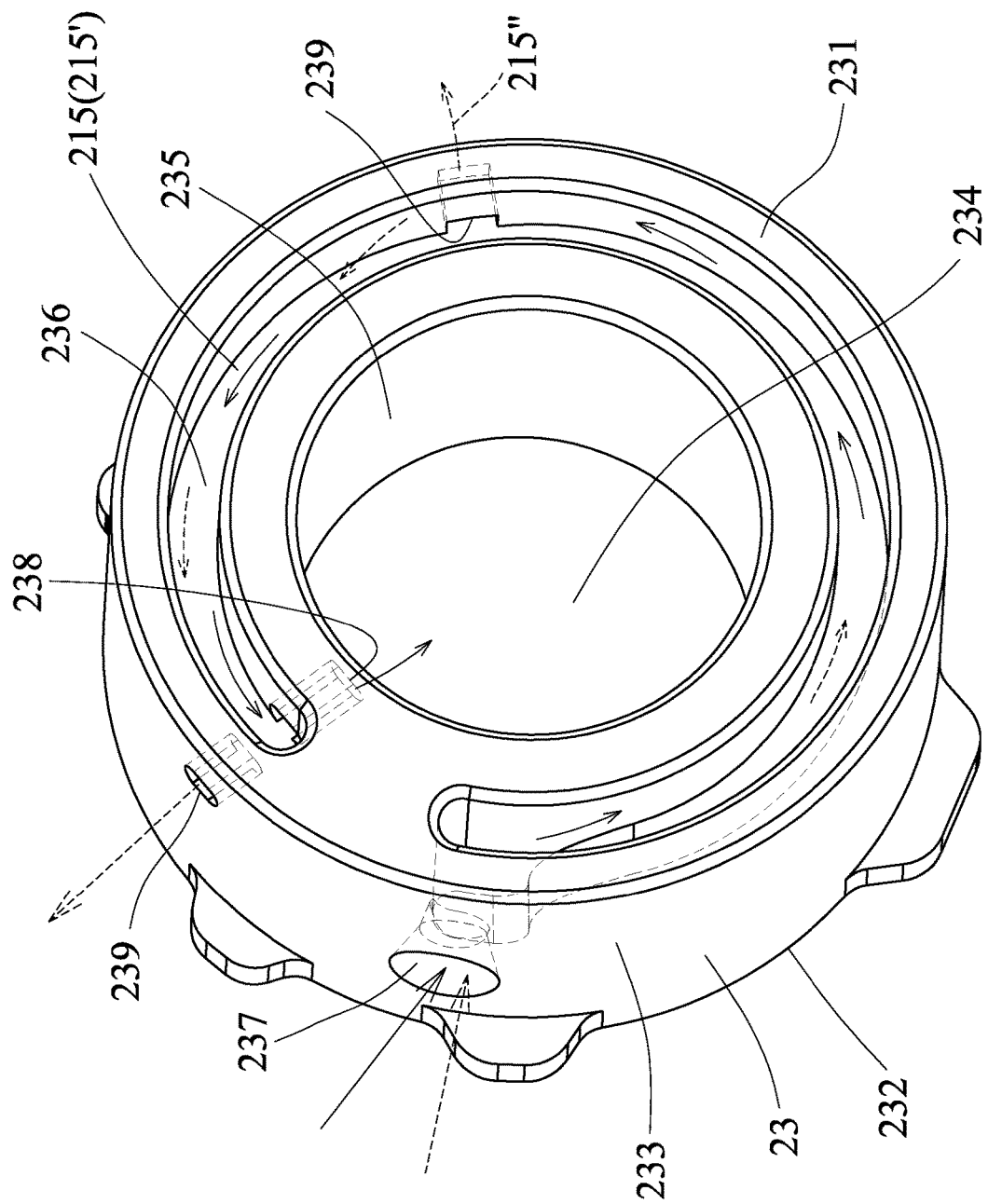
FIG. 10 is a perspective view of the embodiment, illustrating an oil-guiding sleeve of the slide table of the actuator device.
Figure 11:
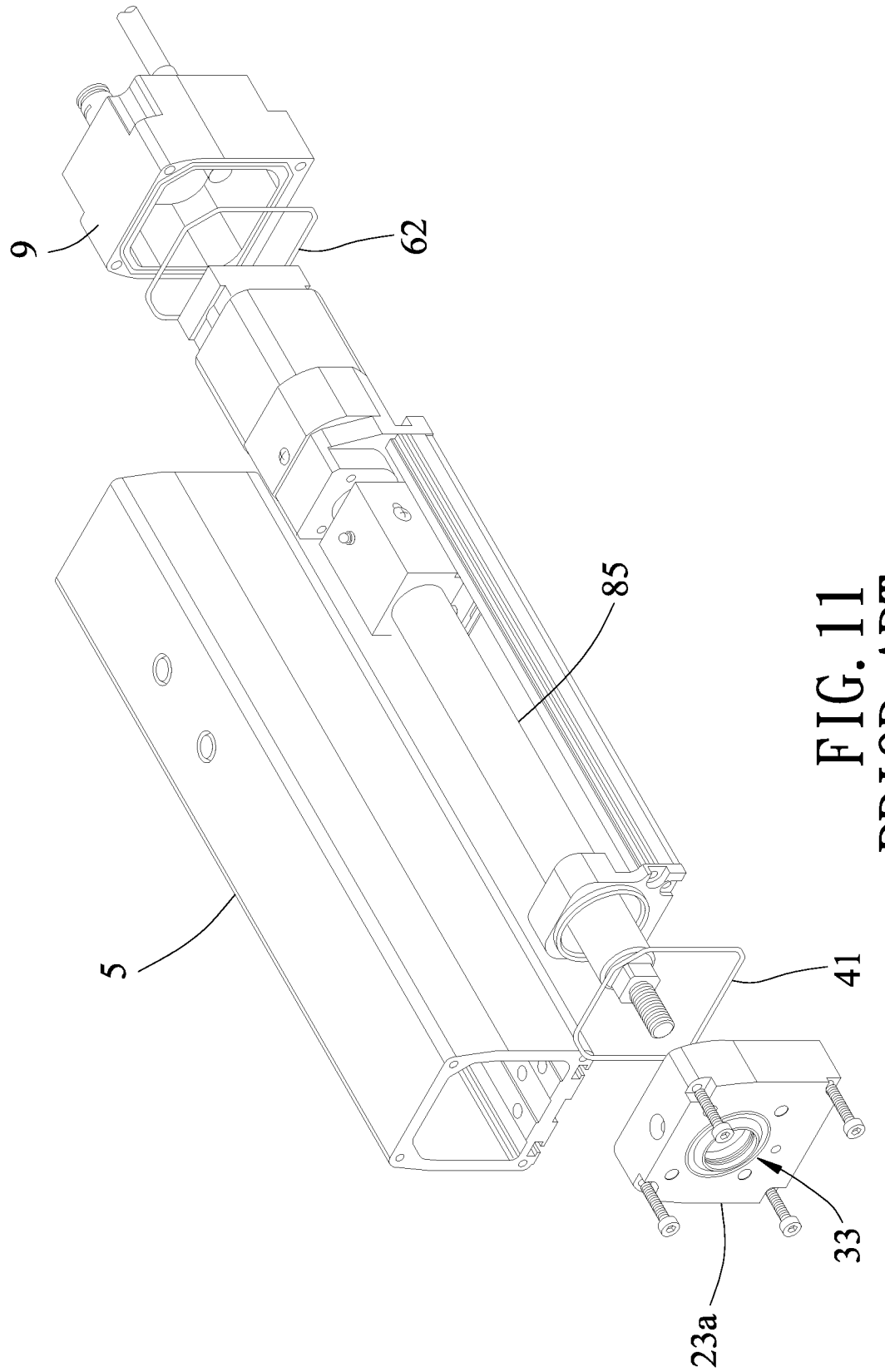
FIG. 11 is an exploded view illustrating an actuator device disclosed in JP5968732.
Figure 12:
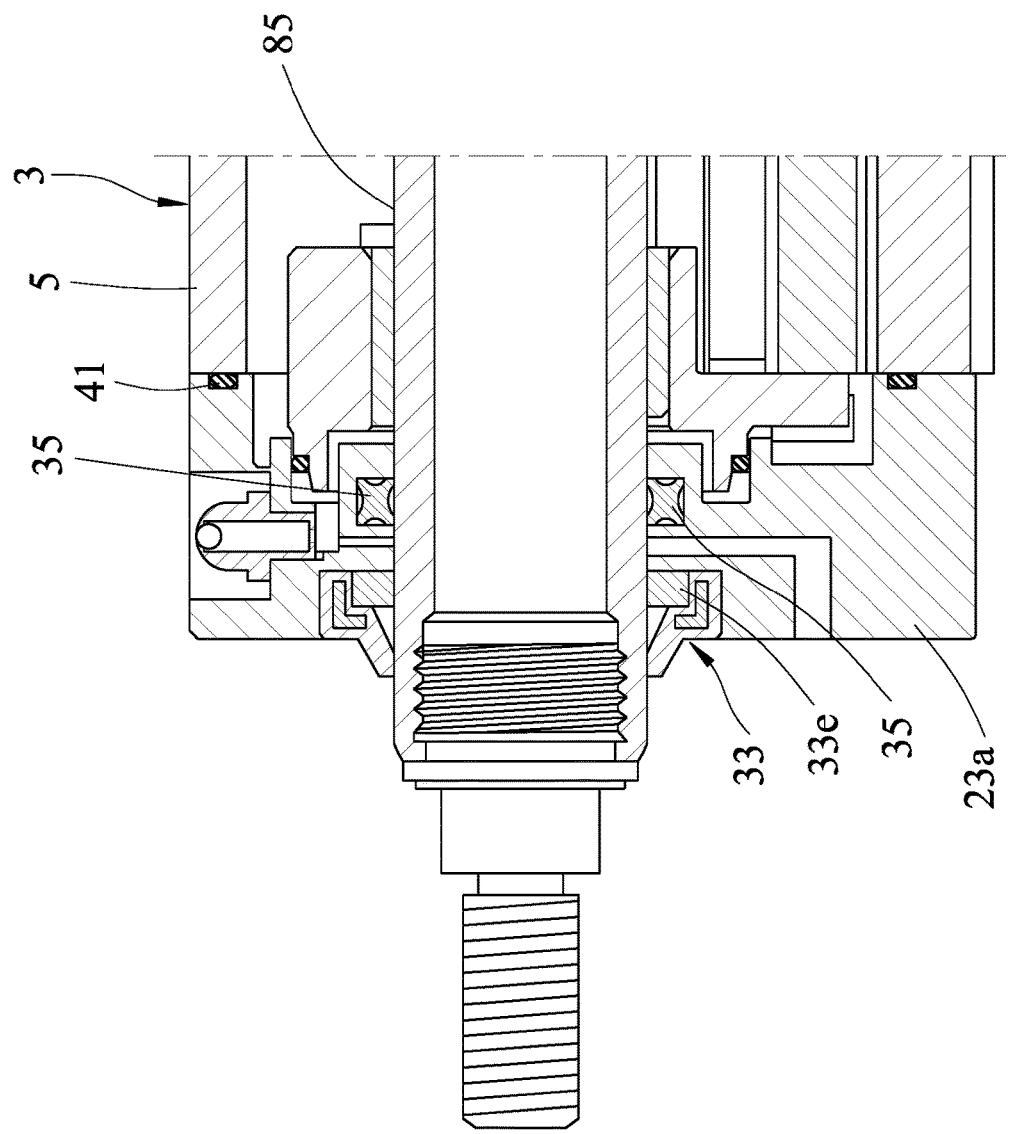
FIG. 12 is a partly section view illustrating the actuator device disclosed in JP5968732

Referring to FIGS. 5 and 10 in combination with FIG. 8, the oil-guiding sleeves 23 are sleeved on a threaded shaft 42 (which will be detailed hereinafter). In this embodiment, each of the oil-guiding sleeves 23 has a first end surface 231, a second end surface 232, an inner surrounding surface 235, an outer surrounding surface 233, an oil-guiding groove 236, an input hole 237, a first output hole 238, and two second output holes 239. The first end surface 231 is oriented toward the nut seat 22. The second end surface 232 is opposite to the first end surface 231 along the axis (L). The inner surrounding surface 235 interconnects the first end surface 231 and the second end surface 232 and defines an inner hole 234. The outer surrounding surface 233 interconnects the first end surface 231 and the second end surface 232 and surrounds the inner surrounding surface 235. The oil-guiding groove 236 is formed in the first end surface 231, is C-shaped, and is disposed about the axis (L). The input hole 237 is formed in the outer surrounding surface 233 and communicates with the oil-guiding groove 236. The first output hole 238 is formed in the inner surrounding surface 235 and communicates with the oil-guiding groove 236. The second output holes 239 are formed in the outer surrounding surface 233 and communicate with the oil-guiding groove 236. As shown in FIG. 8, the oil-guiding groove 236 communicates with the threaded shaft 42 and the ball circulating mechanisms 25 through the first output hole 238 and the second output holes 239. As shown in FIGS. 8 and 10, the oil path 215 has a first oil path section 215' and a second oil path section 215". The first oil path section 215' is formed by the input hole 237, the oil-guiding groove 236, and the first output hole 238, and is adapted for permitting oil supplied to the threaded shaft 42. The second oil path section 215" is formed by the input hole 237, the oil-guiding groove 236, and the second output holes 239, and is adapted for permitting oil supplied to the ball circulating mechanisms 25.

As shown in FIGS. 5 and 9, two side caps 24 are respective mounted to the oil-guiding sleeves 23. Each of the side caps 24 has a C-shaped seal strip 241 sealing the oil-guiding groove 236 of a respective one of the oil-guiding sleeves 23.

As shown in FIGS. 6 and 7, the scraping unit 30 is mounted to the sliding unit 20, and includes a scraping member 31 and a plurality of resilient members 32. The scraping member 31 is in the form of a rectangular hollow frame, is movably inserted into the first recesses 212 and the second recesses 213, and abuts against the abrasive-resistant layer 133. The resilient members 32 are disposed between the scraping member 31 and the sliding table 21, and resiliently bias the scraping member 31 toward the steel belt 13.

The driving unit 40 is mounted to the base unit 10, and includes a driving member 41 and the threaded shaft 42 that is threadedly connected to the nut seat 22, such that the driving member 41 is operable to drive rotation of the threaded shaft 42 to thereby move the sliding unit 20 along the threaded shaft 42 relative to the base unit 10. As shown in FIGS. 8 and 10, oil may be supplied to the threaded shaft 42 through the first oil path section 215' formed by the input hole 237, the oil-guiding groove 236, and the first output hole 238.

As shown in FIGS. 1, 3 to 8, after assembling the actuator device of the disclosure is completed, the sliding unit 20 is disposed on and connected to the base unit 10 in a movable manner, the nut seat 22 is threadedly connected to the threaded shaft 42, and the steel belt 13 covers the bottom opening of the receiving space 114 and is attracted to the magnets 12. Because the resilient members 32 resiliently bias the scraping member 31 toward the steel belt 13, an end of the scraping member 31 may abut against the abrasive-resistant layer 133 of the steel belt 13. In practice, when the driving member 41 is operated to drive rotation of the threaded shaft 42, because the nut seat 22 is threadedly connected to the threaded shaft 42, rotation of the threaded shaft 42 may bring the sliding unit 20 to move in the longitudinal direction (X) relative to the base unit 10, thereby completing operations of processing and conveying as expected.

During movement of the sliding unit 20 relative to the base unit 10, by virtue of the magnets attracting the steel belt 13, the steel belt 13 is moved to a bottom side of the base seat 11 and covers the bottom opening of the receiving space 114.

When the sliding unit 20 is moved relative to the base unit 10, because the steel belt 13 extending through the pass channel 211 contacts the first abutting portion 217', the second abutting portion 217", and the top abutting portion 216', tension on the steel belt 13 may remain constant to prevent the steel belt 13 from impeding smooth movement of the sliding unit 20 relative to the base unit 10. Furthermore, the abrasive-resistant layer 133 of the steel belt 13 prevents the steel belt 13 from being scratched.

By virtue of the resilient members 32 resiliently biasing the scraping member 31 toward the steel belt 13, the end of the scraping member 31 may abut against the abrasive-resistant layer 133 of the steel belt 13. By virtue of the scraping member 31 in the form of the rectangular hollow frame abutting against the steel belt 13, foreign objects are prevented from entering the pass channel 211. During movement of the sliding unit 20 relative to the base unit 10, the scraping member 31 scrapes water and dirt off the abrasive-resistant layer 133 of the steel belt 13.

When the sliding unit 20 is driven to slide to an end of the base unit 10 away from the driving member 41, the one-way valve 214 is aligned with the oil injection hole 117, and the sliding unit 20 is at an oil injecting position. Accordingly, when an oil nozzle (not shown) is inserted into the oil injection hole 117, oil may be injected into the one-way valve 214. As a result, the oil may be supplied to the threaded shaft 42 through the first oil path section 215' formed by the input hole 237, the oil-guiding groove 236, and the first output hole 238. Meanwhile, the oil may be supplied to the ball circulating mechanisms 25 through the second oil path section 215" formed by the input hole 237, the oil-guiding groove 236, and the second output holes 239. In this embodiment, the first oil path section 215' and the second oil path section 215" are not equal in length so as to cause a pressure difference between oil-injecting terminal ends respectively formed at the first oil path section 215' and the second oil path section 215" when the oil is supplied to the first oil path section 215' and the second oil path section 215". Based on Solvay Flowing software analysis, the input hole 237 is designed to be tapered from the outer surrounding surface 233 toward the oil-guiding groove 236 (as shown in FIGS. 5 and 10) such that the oil may be uniformly distributed to the oil-injecting terminal ends.

Because the base seat 11 has the inverted U-shaped cross section, and because the steel belt 13 covers the bottom opening of the receiving space 114 defined by the base seat 11, the water and dirt are prevented from entering the receiving space 114.

By virtue of an overall structural configuration of the actuator device of the disclosure, the actuator device has an ingress protection 68 (IP68) rating. That is to say, the actuator device of disclosure is water resistant in fresh water to a maximum depth of 1.5 meters for up to 30 minutes, and is dustproof.

In summary, the overall structure of the actuator device of the disclosure is simple. The actuator device of the disclosure can be easily manufactured and assembled, and have the IP68 rating.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," "an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An actuator device comprising:
    a base unit including
        a base seat that is elongated in a longitudinal direction, that has an inverted U-shaped cross section, and that defines a receiving space opening downwardly and having a bottom opening,
        two magnets that extend in the longitudinal direction, that are mounted to said base seat, that are spaced apart from each other in a transverse direction perpendicular to the longitudinal direction, and that are disposed respectively at opposite sides of said bottom opening of said receiving space, and
        a steel belt that covers said bottom opening of said receiving space and that is attracted to said magnets, said steel belt having a main layer that has an inner surface facing said receiving space and an outer surface opposite to said inner surface, and an abrasive-resistant layer that is fixedly coated on said outer surface;
    a sliding unit disposed on said base unit, movable along an axis that is parallel to the longitudinal direction relative to said base unit, and including
        a sliding table that has a pass channel having opposite ends in the longitudinal direction, said steel belt extending through said pass channel and being in contact with said sliding table at a plurality of contact portions, and
        a nut seat that is connected to said sliding table;
    a scraping unit mounted to said sliding unit, and including a scraping member that abuts against said abrasive-resistant layer; and
    a driving unit mounted to said base unit, and including a driving member and a threaded shaft that is threadedly connected to said nut seat, such that said driving member is operable to drive rotation of said threaded shaft to thereby move said sliding unit along said threaded shaft relative to said base unit;
    wherein said sliding table further has two first recesses that extend in the longitudinal direction and that are parallel to each other, and two second recesses that extend in the transverse direction, and that communicate with said first recesses;
    wherein said scraping member is inserted into said first recesses and said second recesses; and
    wherein said scraping unit further includes a plurality of resilient members that are disposed between said scraping member and said sliding table and that resiliently bias said scraping member toward said steel belt.

2. The actuator device as claimed in claim 1, wherein:
    said base seat of said base unit has an oil injection hole, and
    said sliding table further has a one-way valve to be aligned with said oil injection hole and adapted for permitting oil supplied from said oil injection hole to flow along an oil path into said sliding unit.

3. The actuator device as claimed in claim 2, wherein:
    said sliding unit further includes
        two oil-guiding sleeves that are mounted to said sliding table and that are sleeved on said threaded shaft,
        two ball circulating mechanisms that are mounted in said sliding table, and
        two ball sets that are respectively mounted in said ball circulating mechanisms; and
    at least one of said oil-guiding sleeves has an oil-guiding groove that communicates with said threaded shaft and said ball circulating mechanisms.

4. The actuator device as claimed in claim 3, wherein:
    said at least one of said oil-guiding sleeves further has
        a first end surface that is oriented toward said nut seat, said oil-guiding groove being formed in said first end surface and being C-shaped,
        a second end surface that is opposite to said first end surface along the axis,
        an inner surrounding surface that interconnects said first end surface and said second end surface and that defines an inner hole,
        an outer surrounding surface that interconnects said first end surface and said second end surface and that surrounds said inner surrounding surface,
        an input hole that is formed in said outer surrounding surface and that communicates with said oil-guiding groove,
        a first output hole that is formed in said inner surrounding surface and that communicates with said oil-guiding groove, and
        two second output holes that are formed in said outer surrounding surface and that communicate with said oil-guiding groove; and
    said oil path has
        a first oil path section that is formed by said input hole, said oil-guiding groove, and said first output hole and that is adapted for permitting oil supplied to said threaded shaft, and
        a second oil path section that is formed by said input hole, said oil-guiding groove, and said second output holes and that is adapted for permitting oil supplied to said ball circulating mechanisms.

5. The actuator device as claimed in claim 1, wherein:
    said sliding table has
        a main body,
        a first side body that is connected to one end of said main body,
        a second side body that is connected to another end of said main body opposite to said first side body in the longitudinal direction; and
    said pass channel is defined between a top channel surface that is formed on said main body, and a bottom channel surface that is formed on said first and second side bodies.

6. The actuator device as claimed in claim 5, wherein:
    said bottom channel surface has
        a first abutting portion that is formed on said first side body and that projects curvedly upwardly,
        a second abutting portion that is formed on said second side body and that projects curvedly upwardly, and
        an intermediate portion that is formed on said main body and that is disposed between and lower than said first abutting portion and said second abutting portion;
    said top channel surface has a top abutting portion that projects curvedly and downwardly toward said intermediate portion of said bottom channel surface; and
    said steel belt is in contact with said first abutting portion, said second abutting portion, and said top abutting portion at said contact portions, respectively.

7. The actuator device as claimed in claim 6, wherein:
    said first recesses and said second recesses form a rectangular configuration;
    said first recesses are spaced apart from each other in the transverse direction and are disposed respectively at two opposite sides of said intermediate portion of said bottom channel surface; and said second recesses are formed respectively in said first abutting portion and said second abutting portion of said bottom channel surface.

8. An actuator device comprising:

a base unit including
- a base seat that is elongated in a longitudinal direction, that has an inverted U-shaped cross section, and that defines a receiving space opening downwardly and having a bottom opening,
- two magnets that extend in the longitudinal direction, that are mounted to said base seat, that are spaced apart from each other in a transverse direction perpendicular to the longitudinal direction, and that are disposed respectively at opposite sides of said bottom opening of said receiving space, and
- a steel belt that covers said bottom opening of said receiving space and that is attracted to said magnets, said steel belt having a main layer that has an inner surface facing said receiving space and an outer surface opposite to said inner surface, and an abrasive-resistant layer that is fixedly coated on said outer surface;

a sliding unit disposed on said base unit, movable along an axis that is parallel to the longitudinal direction relative to said base unit, and including
- a sliding table that has a pass channel having opposite ends in the longitudinal direction, said steel belt extending through said pass channel and being in contact with said sliding table at a plurality of contact portions, and
- a nut seat that is connected to said sliding table;

a scraping unit mounted to said sliding unit, and including
- a scraping member that abuts against said abrasive-resistant layer; and a driving unit mounted to said base unit, and including a driving member and a threaded shaft that is threadedly connected to said nut seat, such that said driving member is operable to drive rotation of said threaded shaft to thereby move said sliding unit along said threaded shaft relative to said base unit;

wherein said base seat of said base unit has an oil injection hole;

wherein said sliding table further has a one-way valve to be aligned with said oil injection hole and adapted for permitting oil supplied from said oil injection hole to flow along an oil path into said sliding unit;

wherein said sliding unit further includes
- two oil-guiding sleeves that are mounted to said sliding table and that are sleeved on said threaded shaft,
- two ball circulating mechanisms that are mounted in said sliding table, and
- two ball sets that are respectively mounted in said ball circulating mechanisms;

wherein at least one of said oil-guiding sleeves has an oil-guiding groove that communicates with said threaded shaft and said ball circulating mechanisms;

wherein said at least one of said oil-guiding sleeves further has
- a first end surface that is oriented toward said nut seat, said oil-guiding groove being formed in said first end surface and being C-shaped,
- a second end surface that is opposite to said first end surface along the axis,
- an inner surrounding surface that interconnects said first end surface and said second end surface and that defines an inner hole,
- an outer surrounding surface that interconnects said first end surface and said second end surface and that surrounds said inner surrounding surface,
- an input hole that is formed in said outer surrounding surface and that communicates with said oil-guiding groove,
- a first output hole that is formed in said inner surrounding surface and that communicates with said oil-guiding groove, and
- two second output holes that are formed in said outer surrounding surface and that communicate with said oil-guiding groove; and wherein said oil path has
- a first oil path section that is formed by said input hole, said oil-guiding groove, and said first output hole and that is adapted for permitting oil supplied to said threaded shaft, and
- a second oil path section that is formed by said input hole, said oil-guiding groove, and said second output holes and that is adapted for permitting oil supplied to said ball circulating mechanisms.

9. The actuator device as claimed in claim 8, wherein:

said sliding table further has
- two first recesses that extend in the longitudinal direction and that are parallel to each other, and
- two second recesses that extend in the transverse direction, and that communicate with said first recesses;

said scraping member is inserted into said first recesses and said second recesses; said scraping unit further includes a plurality of resilient members that are disposed between said scraping member and said sliding table and that resiliently bias said scraping member toward said steel belt;

said sliding table has
- a main body,
- a first side body that is connected to one end of said main body,
- a second side body that is connected to another end of said main body opposite to said first side body in the longitudinal direction; and said pass channel is defined between a top channel surface that is formed on said main body, and a bottom channel surface that is formed on said first and second side bodies.

10. The actuator device as claimed in claim 9, wherein:

said bottom channel surface has
- a first abutting portion that is formed on said first side body and that projects curvedly upwardly,
- a second abutting portion that is formed on said second side body and that projects curvedly upwardly, and
- an intermediate portion that is formed on said main body and that is disposed between and lower than said first abutting portion and said second abutting portion;

said top channel surface has a top abutting portion that projects curvedly and downwardly toward said intermediate portion of said bottom channel surface; and said steel belt is in contact with said first abutting portion, said second abutting portion, and said top abutting portion at said contact portions, respectively.

11. The actuator device as claimed in claim 10, wherein:

said first recesses and said second recesses form a rectangular configuration;

said first recesses are spaced apart from each other in the transverse direction and are disposed respectively at two opposite sides of said intermediate portion of said bottom channel surface; and said second recesses are formed respectively in said first abutting portion and said second abutting portion of said bottom channel surface.

\* \* \* \* \*